US011308361B1

(12) United States Patent
Aitken et al.

(10) Patent No.: US 11,308,361 B1
(45) Date of Patent: Apr. 19, 2022

(54) CHECKERBOARD ARTIFACT FREE SUB-PIXEL CONVOLUTION

(71) Applicant: Twitter, Inc., San Francisco, CA (US)

(72) Inventors: Andrew Aitken, London (GB); Christian Ledig, London (GB); Lucas Theis, London (GB); Jose Caballero, London (GB); Zehan Wang, London (GB); Wenzhe Shi, London (GB)

(73) Assignee: Twitter, Inc., San Francisco, CA (US)

( * ) Notice: Subject to any disclaimer, the term of this patent is extended or adjusted under 35 U.S.C. 154(b) by 150 days.

(21) Appl. No.: 16/028,374

(22) Filed: Jul. 5, 2018

Related U.S. Application Data

(60) Provisional application No. 62/529,739, filed on Jul. 7, 2017.

(51) Int. Cl.
*G06K 9/62* (2006.01)
(52) U.S. Cl.
CPC .................................. *G06K 9/6262* (2013.01)
(58) Field of Classification Search
None
See application file for complete search history.

(56) References Cited

U.S. PATENT DOCUMENTS

| 2005/0200757 | A1 | 9/2005 | Pica et al. |
| 2016/0078600 | A1 | 3/2016 | Perez Pellitero et al. |
| 2017/0193680 | A1 | 7/2017 | Zhang et al. |
| 2017/0317983 | A1* | 11/2017 | Kompalli ............ G06F 21/6209 |
| 2017/0347060 | A1 | 11/2017 | Wang et al. |
| 2018/0129893 | A1 | 5/2018 | Son et al. |
| 2018/0293707 | A1* | 10/2018 | El-Khamy ............ G06T 3/4046 |
| 2019/0095795 | A1* | 3/2019 | Ren ...................... G06N 3/0454 |
| 2020/0012940 | A1* | 1/2020 | Liu ...................... H04N 7/0135 |

OTHER PUBLICATIONS

Image super resolution using deep convolutional networks, by Dong et al., arXiv:1501.00092v3 [cs.CV] Jul. 31, 2015.*
Dong, et al., "Accelerating the super-resolution convolutional neural network: Supplementary file", European Conference on Computer Vision, 2016, 5 pages.
Dong, et al., "Learning a Deep Convolutional Network for Image Super-Resolution", ECCV 2014, Part IV, LNCS 8692, Sep. 6, 2014, pp. 184-199.
Dosovitskiy, et al., "Flownet: Learning Optical Flow with Convolutional Networks", IEEE International Conference an Computer Vision, 2015, pp. 2758-2766.

(Continued)

*Primary Examiner* — Vikkram Bali
(74) *Attorney, Agent, or Firm* — Brake Hughes Bellermann LLP

(57) ABSTRACT

An example system includes a processor and a memory. The system performs sub-pixel convolution that is free of checkerboard artifacts. In one example implementation, the system may execute a method that includes initializing one or more parameters of a sub-kernel of a kernel and copying the one or more parameters of the sub-kernel to other sub-kernels of the kernel. The method may further include performing convolution of an input image with the sub-kernels of the kernel and generating a plurality of first output images. A second output image is then generated based on the plurality of first output images.

20 Claims, 9 Drawing Sheets

(56) References Cited

OTHER PUBLICATIONS

Dumoulin, et al., "A Guide to Convolution Arithmetic for Deep Learning", arXiv:1603.07285, 2016, 31 pages.
Dumoulin, et al., "Adversarially learned inference", ICLR 2017, arXiv:1606.00704, 2016, 18 pages.
Gao, et al., "Pixel Deconvolutional Networks", arXiv: 1705.06820, Nov. 27, 2017, 11 pages.
He, et al., "Identity Mappings in Deep Residual Networks", European Conference on Computer Vision, Jul. 25, 2016, pp. 630-645.
Johnson, et al., "Perceptual losses for real-time style transfer and super-resolution", ECCV 2016, arXiv:1603.08155v1, Mar. 27, 2016, 17 pages.
Kim, et al., "Deeply-Recursive Convolutional Network for Image Super-Resolution", arXiv: 1511.04491, 2015, pp. 1637-1645.
Kingma, et al., "Adam: A Method for Stochastic Optimization", International Conference on Learning Representations, 2015, 15 pages.
Ledig, et al., "Photo-Realistic Single Image Super-Resolution Using a Generative Adversarial Network", Proceedings of the IEEE Conference on Computer Vision and Pattern Recognition, May 25, 2017, 19 pages.
Long, et al., "Fully convolutional networks for semantic segmentation", IEEE Conference on Computer Vision and Pattern Recognition (CVPR), 2015, pp. 3431-3440.
Martin, et al., "A database of human segmented natural images and its application to evaluating segmentation algorithms and measuring ecological statistics", Proceedings Eighth IEEE International Conference on Computer Vision, Jul. 7-14, 2001, pp. 416-423.
Odena, et al., "Conditional image synthesis with auxiliary classifier GANs", arXiv:1610.09585, Jul. 20, 2017, 12 pages.
Odena, et al., "Deconvolution and Checkerboard Artifacts", Distill 1, No. 10, http://doi.org/10.23915/distill.00003, Oct. 17, 2016, 9 pages.
Radford, et al., "Unsupervised Representation Learning With Deep Convolutional Generative Adversarial Networks", ICLR 2016, Jan. 7, 2016, 16 pages.
Russakovsky, et al., "ImageNet Large Scale Visual Recognition Challenge", International Journal of Computer Vision, 115(3), Jan. 30, 2015, pp. 211-252.
Saxe, et al., "Exact solutions to the nonlinear dynamics of learning in deep linear neural networks", arXiv:1312.6120, 2013, 22 pages.
Shi, et al., "Is the deconvolution layer the same as a convolutional layer?", arXiv:1609.07009, 2016, 7 pages.
Shi, et al., "Real-time single image and video super-resolution using an efficient sub-pixel convolutional neural network", IEEE Conf. on Computer Vision and Pattern Recognition, Sep. 23, 2016, 10 pages.
Simonyan, et al., "Very deep convolutional networks for large-scale image recognition", International Conference on Learning Representations, Apr. 10, 2015, 14 pages.
Vedaldi, et al., "Matconvnet: Convolutional Neural Networks for Matlab", Proceedings of the 23rd ACM International Conference on Multimedia, 2015, 59 pages.
Zeiler, et al., "Adaptive deconvolutional networks for mid and high level feature learning", IEEE International Conference on Computer Vision, 2011, 8 pages.
Zeiler, et al., "Visualizing and Understanding Convolutional Networks", ECCV 2014, Part I, LNCS 8689, 2014, pp. 818-833.
Dong, et al., "Compression Artifacts Reduction by a Deep Convolutional Network", IEEE International Conference on Computer Vision, Apr. 27, 2015, pp. 576-584.
International Search Report and Written Opinion for PCT Application No. PCT/GB2016/050424, dated May 11, 2016, 9 pages.

* cited by examiner

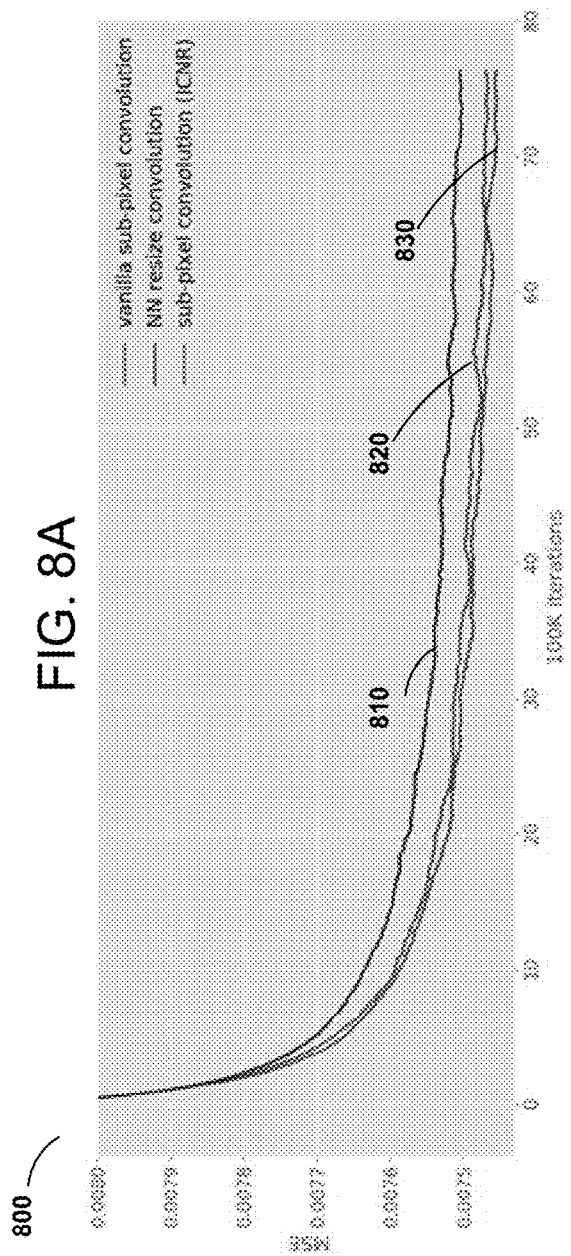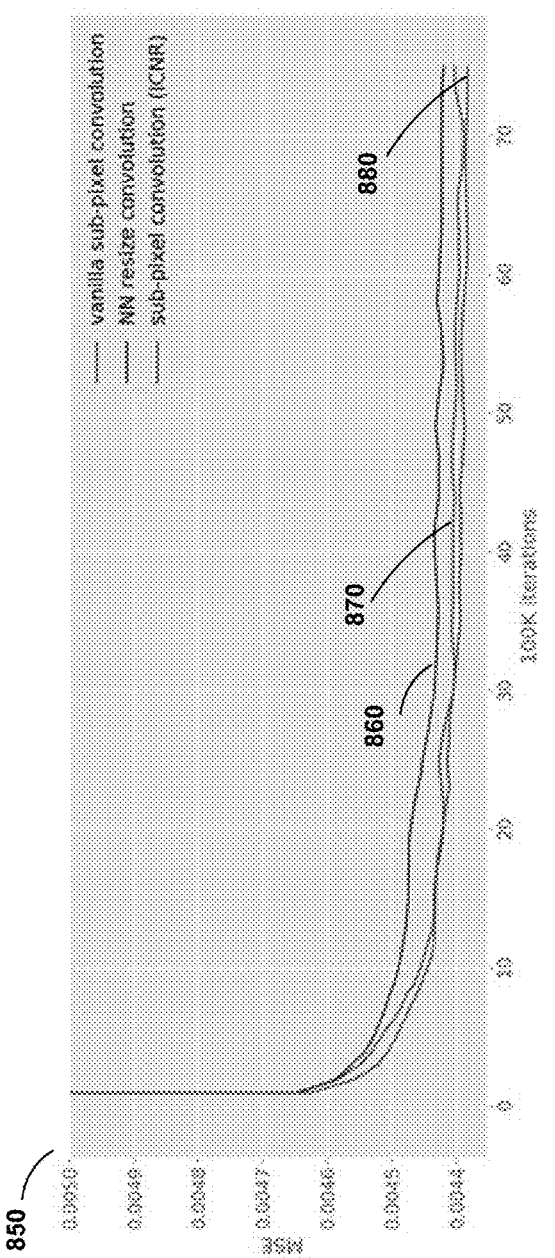

CHECKERBOARD ARTIFACT FREE SUB-PIXEL CONVOLUTION

CROSS-REFERENCE TO RELATED APPLICATION

This application is a Non-Provisional of, and claims priority to, U.S. Provisional Application No. 62/529,739, titled "Checkerboard Artifact Free Sub-Pixel Convolution," filed on Jul. 7, 2017, the disclosure of which is incorporated herein by reference.

BACKGROUND

Machine learning is the field of study where a computer or computers learn to perform classes of tasks using feedback generated from experience or data that the machine learning process acquires during performance of those tasks by the computer. Typically, machine learning includes providing example inputs for training a machine learned model and, once the model has been trained, the machine learned model can be used in an inference mode to perform the task on a new, previously unseen, input. The example inputs for training an inference are typically referred to as features. Predictions and classifications made by machine learning models are highly dependent on the features of the input provided. Historical data can be valuable for some such processes, but expensive to store and historical metrics (e.g., counts, averages, ratios, etc.) may require large amounts of processing cycles to calculate. Convolutional neural networks (CNNs) in the field of machine learning are a popular choice for pixel-wise dense prediction or generation. However, CNNs suffer from checkerboard artifacts.

SUMMARY

A method, device/system, and/or computer-readable storage medium to perform sub-pixel convolution that are free of checkerboard artifacts are described. In one example implementation, the system may execute a method that includes initializing one or more parameters of a sub-kernel of a kernel and copying the one or more parameters of the sub-kernel to other sub-kernels of the kernel. The method may further include performing convolution of an input image with the sub-kernels of the kernel and generating a plurality of first output images. A second output image is then generated based on the plurality of first output images.

BRIEF DESCRIPTION OF THE DRAWINGS

FIGS. 8A and 8B illustrate the advantages (benefits, etc.) of an example implementation of an initialization, according to an implementation.

Like reference symbols in the various drawings indicate like elements.

DETAILED DESCRIPTION

Convolutional neural networks (CNNs) are widely used for pixel-wise dense prediction or generation as they provide good performance while being computationally efficient. Pixel-wise dense prediction may be generally defined as predicting a label for each pixel in an image. One of the objectives of CNNs is to increase the resolution (e.g., upscaling) of an input image (e.g., input to the network) which may be, for example, a low resolution (LR) image. The low resolution inputs may be, for example, low-dimensional noise vectors in image generation or LR feature maps for network visualization.

A network layer performing upscaling is commonly referred to as a "deconvolution layer," and has been used in a wide range of applications including super resolution, semantic segmentation, flow estimation, and/or generative modeling. The deconvolution layer is also referred to as sub-pixel or fractional convolutional layer, transposed convolutional layer, inverse/up/backward convolutional layer, etc. and may be described and implemented in various ways. However, one of the problems associated with the deconvolution layer is the presence of checkerboard artifacts. That is, at a close view of an image generated by CNNs, a checkerboard pattern of artifacts is visible in the image.

Figure 1:
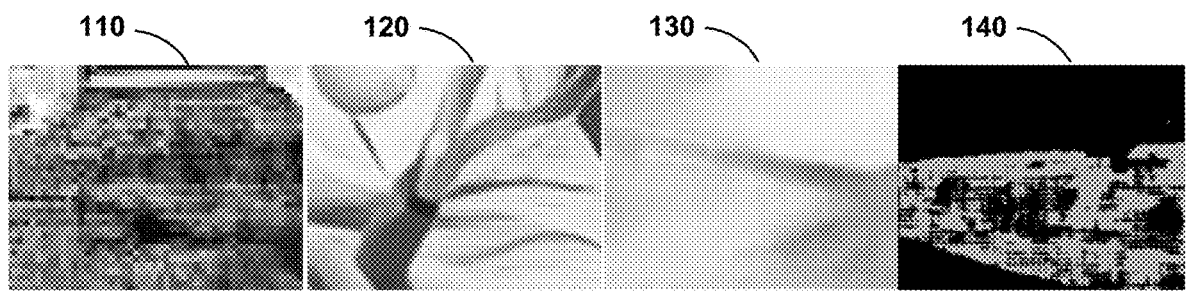
FIG. 1 illustrates varying degrees of checkerboard artifacts in images.

FIG. 1 illustrates varying degrees of checkerboard artifacts, for example, in a generated image 110, a super-resolved image 120, a dense flow 130, and a dense label 140, when CNNs are used. The source of checkerboard artifacts may be deconvolution overlap, random initialization, and/or loss functions. For instance, when a kernel size of a deconvolution layer is not divisible by a stride (e.g., an upscaling factor), the number of LR features that contributes to a single high resolution (HR) feature is not constant across HR feature maps resulting in deconvolution overlap. Additionally, when the kernel size is divisible by the stride, the HR output may still generate (or contain) checkerboard artifacts if the kernels are randomly initialized (referred to as a "random initialization" problem).

The deconvolution overlap and random initialization problems may be addressed by resize convolution and may be a good choice for generative modeling to alleviate checkerboard artifacts. Resize convolution may include upscaling LR feature maps using nearest-neighbor (NN) interpolation followed by a standard convolution with both input/output in HR space. However, a resize convolution process is less flexible as, for example, the parameters (e.g., initialization parameters) are restricted and may reduce super-resolution performance after the parameters have been trained.

Figure 2:
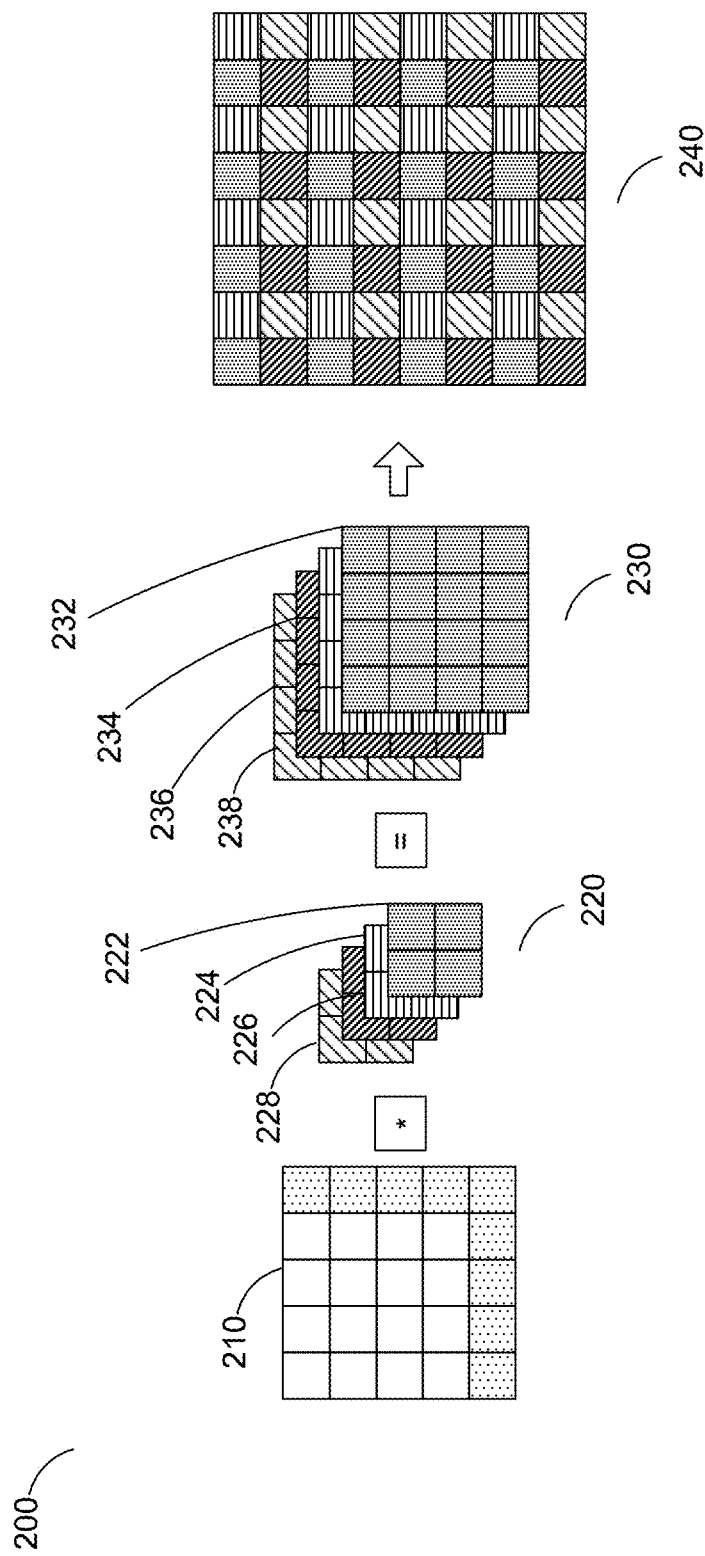
FIG. 2 illustrates an example implementation of sub-pixel convolution followed by re-arrangement of pixels.

FIG. 2 illustrates an example implementation of sub-pixel convolution 200. Sub-pixel convolution may be one example implementation of a deconvolution layer that can be interpreted as a convolution (e.g., convolution in LR space) followed by periodic shuffling operations (e.g., re-arranging of pixels).

In one implementation, for example, FIG. 2 shows an input image 210, convolution kernel 220, output of convolution 230, and/or output of sub-pixel convolution 240. The sub-pixel convolution, as illustrated in FIG. 2, may include convolving the input image 210 with convolution sub-kernels (222, 224, 226, and 228) of the convolution kernel 220 to generate convoluted images 230 (e.g., 232, 234, 236, and/or 238). The sub-pixel convolution may further include using the pixels of the generated convoluted images (e.g., 232, 234, 236, and/or 238) to generate the output of sub-pixel convolution 240, for example, a larger image. The process of convolution followed by shuffling of pixels to generate a larger image introduces checkerboard artifacts. However, as sub-pixel convolution includes a higher number of parameters (e.g., when compared to resize convolution), the sub-pixel convolution may provide for better modeling capabilities and at the same computational capacity. Although sub-pixel convolution does not allow deconvolution overlap, sub-pixel convolution suffers from checkerboard artifacts, as shown in FIG. 3, due to the random initialization problem described above.

Figure 3:
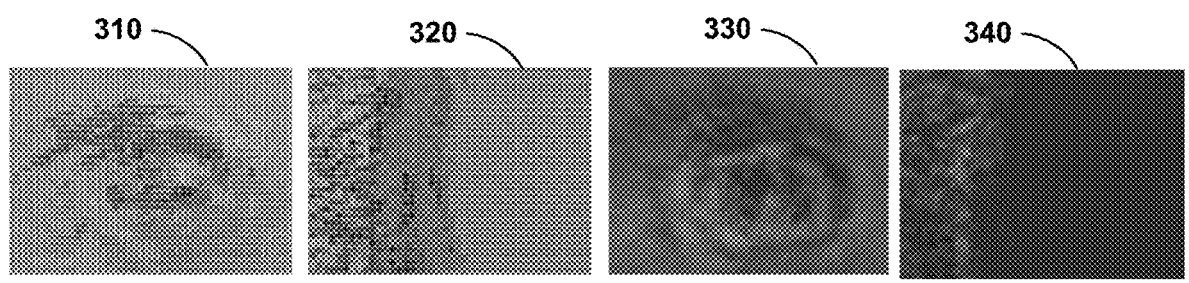
FIG. 3 illustrates example super-resolved images after initialization for sub-pixel convolution and nearest neighbor (NN) resize convolution.

FIG. 3 illustrates example super-resolved images after initialization. For example, images 310 and 320 illustrate images with checkerboard artifacts after random initialization followed by sub-pixel convolution. Images 330 and 340 illustrate images after NN resize followed by convolution. The process of NN resize followed by convolution, used for generating images 330 and 340, is a special case of sub-pixel convolution and is less flexible (e.g., the parameters are too constrained/restricted) and reduces super-resolution performance even after the parameters have been trained. The sub-pixel convolution and NN resize convolution are described below in detail.

A CNN may be trained in several ways. In one example, a color HR image, represented by $I^{HR}$, may be downsampled using, for example, bicubic sampling, by a scale factor of r in each dimension. The downsampling may produce a corresponding LR image, represented by $I^{LR}$. In some implementations, the CNN may be trained to generate a super-resolved image, $I^{SR}$ similar to $I^{HR}$ at the original resolution. In one implementation, the scale factor r may be set to a value of 2 (r=2) and a 5 block ResNet with skip connection may be used for training the CNN. All convolutional layers, except the final layer, of the CNN may have 64 channels and 3×3 filter kernels. The final convolution layer may perform the following operations:

$$I^{SR}=P(W*f^{L-1}(I^{LR})+b), \qquad \text{Equation (1)}$$

where P represents the periodic shuffling operation, W represents the convolution kernel, b represents bias, and $f^{L-1}$ represents the network's output before the last layer. As b is usually initialized such that all elements are 0, b may be neglected in this example to improve readability. In the example described above to generate the SR image, the system may use an upscaling factor of 2 and a kernel W of size (12, 64, 5, 5) with 12 output channels (obtained with 5×5 filters). The 12 output channels may be reorganized by P into $I^{SR}$ with 3 output channels (e.g., one for each color). For resize convolution, to match the computation, the system may resize the activation $f^{L-1}$ with nearest neighbor interpolation and then output 3 channels with 5×5 filters. In some implementations, the system may use orthogonal initialization as the default initialization scheme.

The sub-pixel convolution illustrated in FIG. 2 may be interpreted in two different ways. The first interpretation may consider sub-pixel convolution as a normal convolution followed by periodic shuffling, for example, as illustrated in FIG. 2 and represented by equation (1). The second interpretation may consider sub-pixel convolution as a convolution in sub-pixel space. In the sub-pixel image, $I^{SP}$, void pixels filled with zeroes are created between original pixels as illustrated in FIG. 4 (grey indicates zeros).

Figure 4:
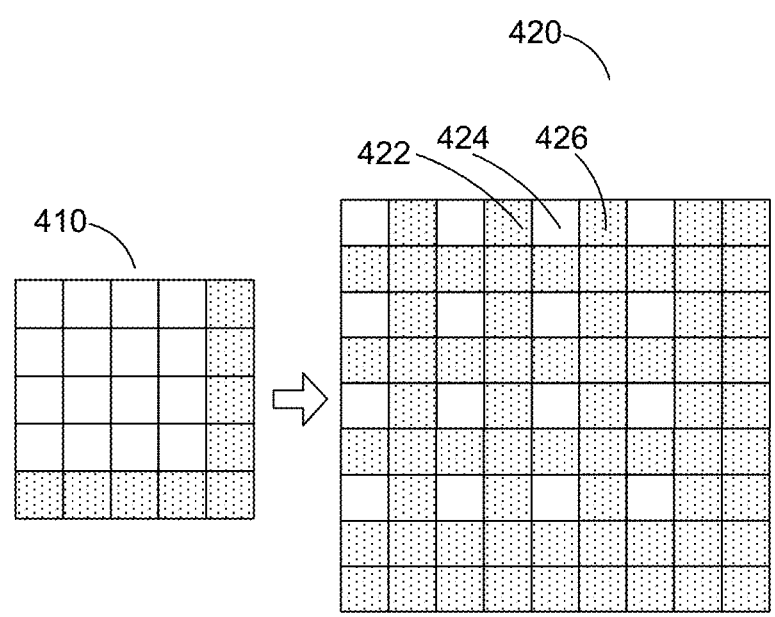
FIG. 4 illustrates generating sub-pixel space from low resolution space.

FIG. 4 illustrates generating (e.g., creating) a sub-pixel space 420 from an LR space 410. In one example, in the sub-pixel image $I^{SP}$ (e.g., image 420), void pixels (e.g., 422, 426) filled with zeroes are created between the original pixels (e.g., 424).

The two interpretations of sub-pixel convolution can be considered identical as the sub-pixel space convolution kernel $W^{SP}$ may be re-created from $r^2$ convolution kernels W in LR space. Therefore, equation (1) may be expressed as:

$$P(W*f^{L-1}(I^{LR}))=W^{SP}*SP(f^{L-1}(I^{LR})), \qquad \text{Equation (2)}$$

where SP is an operation that transforms LR space 410 into sub-pixel space 420. An example of a sub-pixel space convolution kernel $W^{SP}$ with size (3, 64, 10, 10) that is obtained from last layer's convolution kernel W with size (12, 64, 5, 5) straight after the orthogonal initialization is illustrated in the Appendix of the U.S. Provisional Application No. 62/529,739, titled "Checkerboard Artifact Free Sub-Pixel Convolution," filed Jul. 7, 2017, the disclosure of which is incorporated herein by reference.

In an example system, zero-indexed matrices may be used along with a convolution kernel W with size ($c_o$, $c_i$, w, h) where $c_o$ is an integral multiple of the squared rescale factor $r^2$. A sub-kernel is a 2D convolution kernel W (o, i, :, :) where o is the output and i the input channel. For a given $k \in \{0, \ldots, c_o/r^2-1\}$, a group of $r^2$ consecutive sub-kernels, $W_k=\{W (kr^2+n, i, :, :): n \in \{0, \ldots, r^2-1\}\}$ of size ($r^2$, 1, w, h) may recreate one sub-pixel space convolution kernel $W^{SP}(k, i, :, :)$ with size (1, 1, wr, hr). More importantly, the system may also define for a given $n \in \{0, \ldots, r^2-1\}$, a group of sub-kernels $W_n=\{W(kr^2+n,:,:,:): k \in \{0, \ldots, c_o/r^2-1\}\}$. The system may employ this definition of the sub-kernel sets $W_n$ to explain the appearance of checkerboard artifacts after model initialization.

Sub-pixel convolution can also be viewed as:

$$I^{SR}_n=W_n*f^{L-1}(I^{LR}), \qquad \text{Equation (3)}$$

followed by P, which rearranges all $I^{SR}_n$ to be $I^{SR}$, as illustrated in 240 of FIG. 2. This may mean that each of the $r^2$ sub-kernel sets $W_n$ is responsible for only one subset of $I^{SR}$. Conversely, each pixel in $I^{SR}$ only depends on one sub-kernel set $W_n$. Each sub-kernel set $W_n$ being initialized independently but applied to the same input $f^{L-1}(I^{LR})$ to generate neighboring features in HR space may cause the checkerboard artifacts in the generated images after initialization, for example, as illustrated in 310 and 320 of FIG. 3.

Nearest neighbor (NN) resize convolution may be interpreted as filling a sub-pixel space with a nearest neighbor interpolation instead of zeros. This may be followed by a convolution in sub-pixel space to produce HR outputs:

$$I^{SR}=W^{SP}*N(f^{L-1}(I^{LR})), \qquad \text{Equation (4)}$$

where N is NN resize operation. This resolves the problem of deconvolution overlap because the stride is always 1 and effects caused by random initialization are removed because all kernel weights are activated for each calculated HR feature as shown in FIG. 3 (330, 340). However, convolution with zeros in sub-pixel convolution can be skipped but convolution with NN interpolated pixels cannot be skipped in resize convolution. As a result, for the same complexity, sub-pixel convolution has more trainable parameters. Moreover, as convolution includes operations such as multiplications followed by additions, for example, multiplying a number with a zero (e.g., 0*x) and adding of zeros (e.g., s+0*x), such operations may be ignored (e.g., product is 0, and the addition of 0 does not change the values), making sub-pixel convolution more efficient. In other words, the skipping of convolution with zeros in sub-pixel convolution makes the process more efficient as fewer processing cycles and/or memory resources are used. In contrast, as described above, convolution with NN interpolated pixels (non-zeros) cannot be skipped and thereby consuming greater processing cycles and/or memory resources.

The present disclosure describes an initialization scheme or technique (e.g., an improved, enhanced, modified, or new initialization scheme) for sub-pixel convolution to alleviate the problem of checkerboard artifacts due to random initialization. The present disclosure further describes the benefits for image super-resolution due to the additional modeling power of sub-pixel convolution compared to resize convolution, while also removing checkerboard artifacts after initialization.

In one implementation, for example, the method may include initializing one or more parameters of a sub-kernel of a kernel and copying the one or more parameters of the initialized sub-kernel to other sub-kernels of the kernel. The method further includes performing convolution of the input image with the sub-kernels and generating a plurality of first output images and further generating a second output image based on the first output images. Additionally, some implementations may not rely on convolutions in high resolution space but remain unaffected by random initialization. This allows the system to benefit from the efficiency of sub-pixel convolutions (e.g., using less processing cycles and/or memory resources, as described above) while avoiding checkerboard patterns caused by random initialization.

Figure 5:
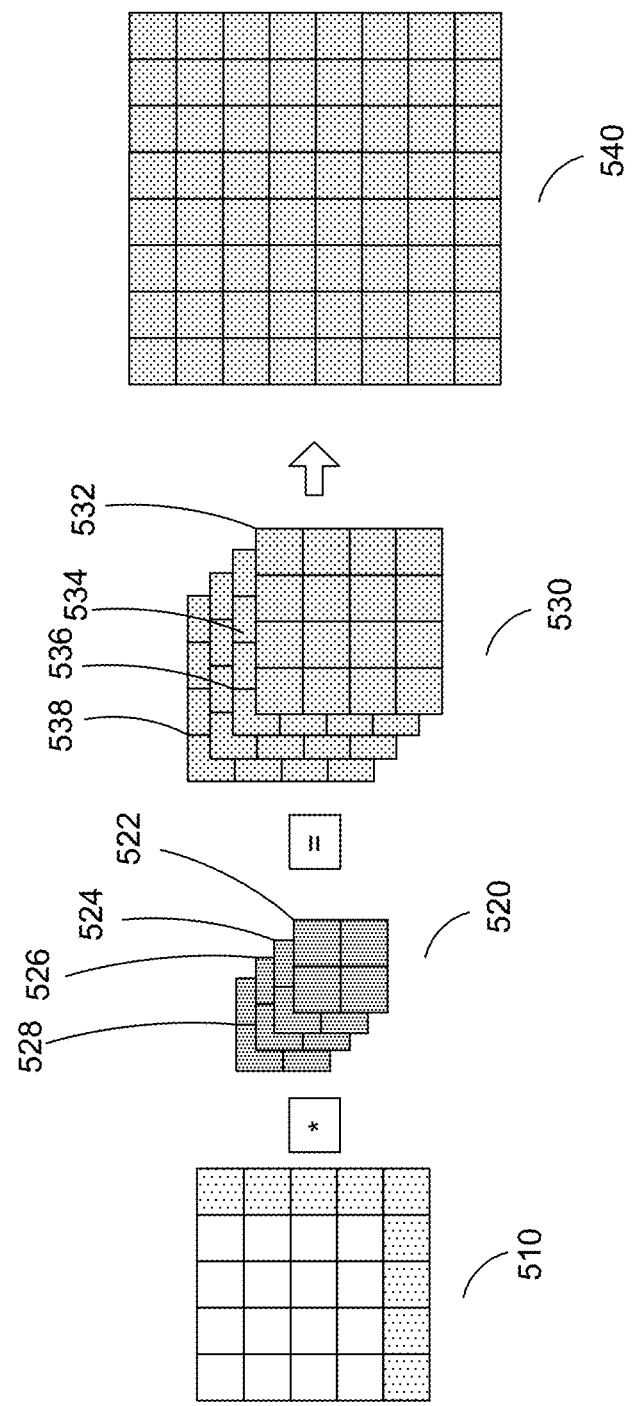
FIG. 5 illustrates an example implementation of the improved initialization scheme of sub-pixel convolution, according to an implementation.

FIG. 5 illustrates an example implementation of the improved initialization scheme of sub-pixel convolution. For example, the improved initialization may include swapping the order of the operations and performing convolution followed by NN resize. In one implementation, the reconstructed image $I^{SR}$ may be expressed as the output of a CNN followed by NN resize.

$$I^{SR}=N(W*f^{L-1}(I^{LR})),\qquad \text{Equation (5)}$$

However, in contrast to the reshuffling operator P, which reduces the number of feature maps by a factor of $r^2$, NN resize preserves the number of feature maps while increasing their spatial resolution. Instead of considering $r^2$ sub-kernel sets $W_n$, a single set $W_0$ may be needed. Using the notation introduced in above, $I^{SR}$ may be written as:

$$I^{SR}=N(W_0*f_{L-1}(I^{LR})):\forall_n\ I^{SR}_n=W_0*f^{L-1}(I^{LR}),\qquad \text{Equation (6)}$$

While NN upsampling (which may be viewed/implemented as a convolution with fixed parameters) produces checkerboard free reconstructions after initialization, NN upsampling has drawbacks in that the upsampling kernel is not trainable, unlike the sub-pixel and resize convolutions. However, to eliminate checkerboard patterns, the system only needs to ensure that the sub-pixel convolution is identical to convolution NN resize after initialization. This means that the system seeks to determine (e.g., compute) initial weights W' such that the following is true after initialization:

$$P(W'*f^{L-1}(I^{LR}))=N(W_0*f^{L-1}(I^{LR})),\qquad \text{Equation (7)}$$

Based on equation (6) and the following relation for general kernels W', $I^{SR}$ may be written as:

$$I^{SR}=P(W'*f^{L-1}(I^{LR})):\forall_n\ I^{SR}_n=W'_n*f^{L-1}(I^{LR}),\qquad \text{Equation (8)}$$

Figure 6:
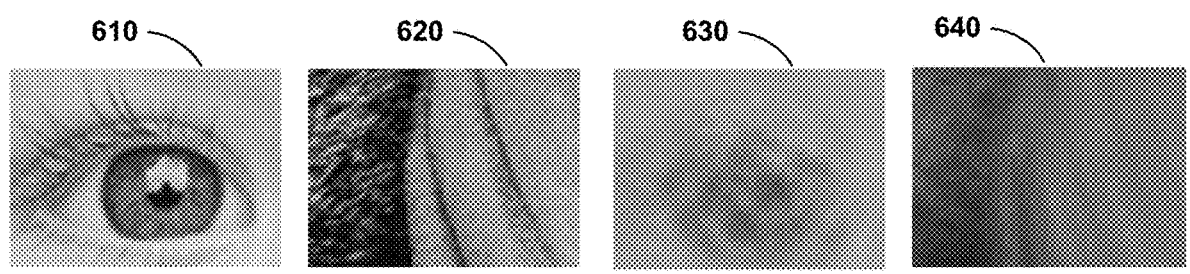
FIG. 6 illustrates example original super-resolved images and after repeat sub-kernel initialized sub-pixel convolution, according to an implementation.

The system described above can prevent checkerboard artifacts after initialization by setting, for instance, $\forall_n:W'_n=W_0$. That is, only initialize $W_0$ can be initialized and the weights copied to the rest of the sub-kernel sets $W'_n$. This means that $W^{SP'}=N(W_0)$. Some examples of the initialized $W^{SP'}$ are shown in the Appendix of U.S. Provisional Application No. 62/529,739 and FIG. 6 which demonstrate that the network is free from checkerboard artifacts immediately after initialization. In FIG. 6 two super resolved images are shown after repeat sub-kernel initialization. Images 610 and 620 show the original HR images. Images 630 and 640 show the results for repeat sub-kernel initialized sub-pixel convolution.

FIG. 6 illustrates example super-resolved images after initialization. For example, images 610 and 620 illustrate original HR images. Images 630 and 640 illustrate the output images based on the improved initialization, as described in FIGS. 5 and 7.

Figure 7:
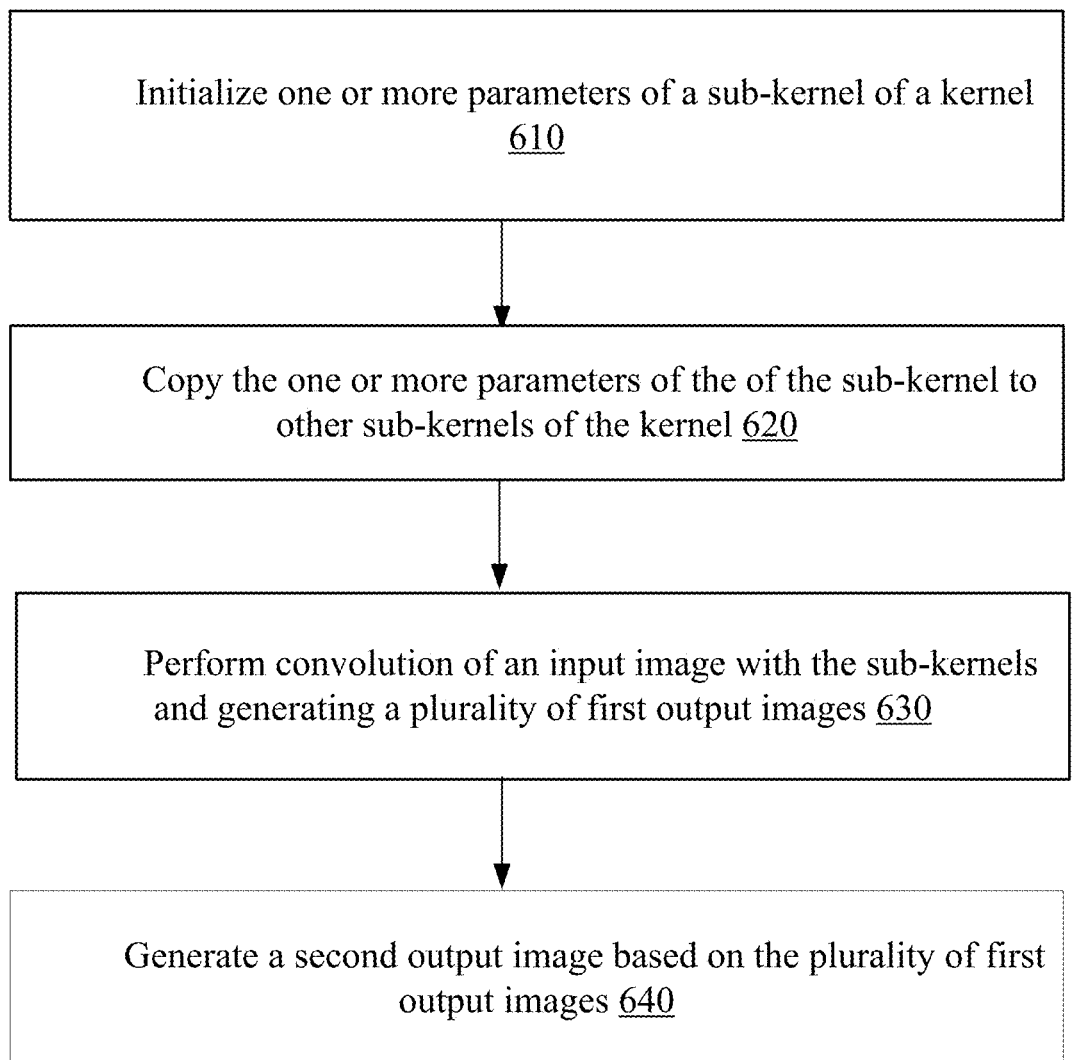
FIG. 7 illustrates a flowchart of an example method of initializing a CNN, according to an implementation.

FIG. 7 illustrates a flowchart 700 of an example method of initializing a CNN. In one implementation, for example, the method may be performed by a computing device (e.g., computing device 900 of FIG. 9) to eliminate checkerboard artifacts.

At block 710, the computing device may initialize one or more parameters of a sub-kernel of a kernel. For example, one more parameters of sub-kernels (522, 524, 526, and 528) of the kernel 520 may be initialized. A parameter of a sub-kernel may be initialized by assigning a weight (e.g., a number). In one implementation, one or more parameters of sub-kernel 522 may be initialized.

At block 720, the computing device may copy the one or more parameters of the sub-kernel to other sub-kernels of the kernel. For example, the computing device may copy the one or more parameters of sub-kernel 522 to sub-kernels 524, 526, and 528. In other words, after the copying, the four sub-kernels have the same parameters initiated (or the same parameters assigned weights). In contrast, as shown in FIG. 2, all the sub-kernels are initiated differently.

In one implementation, the number of sub-kernels that are initialized may be a function of upscaling factor. For example, if upscaling factor is 2, one sub-kernel out of four sub-kernels is initialized and/or if upscaling scaling factor is 3, one sub-kernel out of nine sub-kernels is initialized. In some implementations, the parameters of some of a plurality of sub-kernels may be initiated.

At block 730, the computing device may perform convolution of an input image with the sub-kernels of the kernel and generate a plurality of first output images. For example, the computing device may convolute the input image 510 with the sub-kernels 522, 524, 526, and 528, and generate a plurality of convoluted images 530 (also referred to as a plurality of first output images). The plurality of first images may be identified as 532, 534, 536, and 538.

At block 740, the computing device may generate a second output image based on the plurality of first output images. For example, in one implementation, one larger image, e.g., image 540, may be generated based on the plurality of first images (e.g., images 532, 534, 536, and 538).

The initialization of one sub-kernel (e.g., kernel 522) of the kernel 520 instead of all the sub-kernels of the kernel alleviates (e.g., eliminates) checkerboard artifacts in the second output image 540 as illustrated in FIG. 5. That is, the improved or modified initialization mechanism alleviates the problem of checkerboard artifacts as the sub-kernels have the same parameters initialized (after initializing and copying), for example, with the same values instead of initializing them with random values. Although, the sub-kernels have the same parameters initialized, the overall performance of the CNN is not affected as the initializing/copying applies during the initialization phase of the CNN and the network may be trained to learn further during the learning/training phase to produce a SR/HR image (e.g., second output image). In one implementation, the computing device may make adjustments to the parameters being initialized based on comparing of the output images with other low/high resolution images as part of the machine training. In some implementations, the training may further include adjusting the one or more parameters of the sub-kernel (e.g., based on the learning) and repeating the initializing, the copying, the performing, and the generating to generate SR images free of checkerboard artifacts.

In some implementations, for example, the computing device may initiate a plurality of sub-kernels (e.g., sub-kernels 522 and 524) of the kernel 520, and copy the parameters of sub-kernel 522 to sub-kernel 526 and parameters of sub-kernel 524 to sub-kernel 528, respectively. In other words, sub-kernels 522 and 526 may be considered as one group and sub-kernels 524 and 528 may be considered as another group within the kernel 520. The computing device performs convolution of the input image with the sub-kernels and generates a plurality of first output images and generate a second output image based on the plurality of first output images, as described above. This may alleviate checkerboard artifacts as well.

Thus, the above described initialization scheme produces output images that are free from checkerboard artifacts.

FIGS. 8A and 8B illustrate the effectiveness (e.g., benefits, advantages) of an example implementation of a system trained using several super-resolution models. For example, FIGS. 8A and 8B illustrate training loss over time and test loss over time, respectively.

In one implementation, for example, a CNN is trained using a random sample of 350,000 images from the ImageNet database as input. The input images are in BGR format and normalized to 0 to 1. The output images are also in BGR format and normalized to −1 to 1. The training uses a large dataset, pairs of low resolution and high resolution images, also referred to as a training set. During the training, the initialization parameters are updated iteratively. For example, after each iteration, a training algorithm (e.g., stochastic gradient descent stochastic) selects a small number of examples from the dataset (also referred to as a mini-batch) to compute updates to the initialization parameters as the processing of the entire dataset is computationally expensive. In one implementation, during the training for each mini-batch, the system may crop 16 random 96×96 HR sub-images from different training images.

In some implementations, the system may use an optimizer, e.g., an Adam optimization algorithm. As one example, the system may use Adam optimization with 01=0.9. The CNNs may be trained with a learning rate of 104 for 8*10$^6$ update iterations and the training time on a single M40 GPU may be about 7 days. Mean squared error (MSE) between I$^{HR}$ and I$^{SR}$ may be used as the loss function to assess both training and testing error. In the example of FIG. 8A, the training losses were saved for each iteration and plotted as an average across 350K crops. The test errors were also saved for every 100,000 iterations and calculated as an average across 200 images from a test set of BSD500.

FIGS. 8A and 8B show training losses and testing errors over time, respectively, for NN resize convolution (810, 860), sub-pixel convolution (820, 870), and an example implementation (830, 880). Sub-pixel convolutions (820, 870) may also be referred to as sub-pixel convolution initialized to convolution NN resize (ICNR) in the figures. Thus INCR refers to example implementations, e.g., sub-pixel convolution described above in reference to, at least, FIGS. 5-7. This demonstrates that the parameters (and/or the flexibility provided by the parameters) of sub-pixel convolution allow it to outperform NN resize convolution substantially. Moreover, sub-pixel convolution initialized to convolution NN converges faster and to a better minimum (e.g., less error prone), as compared to standard initialization, and thereby using few processing cycles and/or memory resources and improving the performance of a computing device 900 illustrated in FIG. 9. These results demonstrate that the initialization, as described above, which eliminates checkerboard artifacts, provides a more reasonable starting point for training CNNs compared to random initialization leading to less use of processing cycles and/or memory resources.

Figure 9:
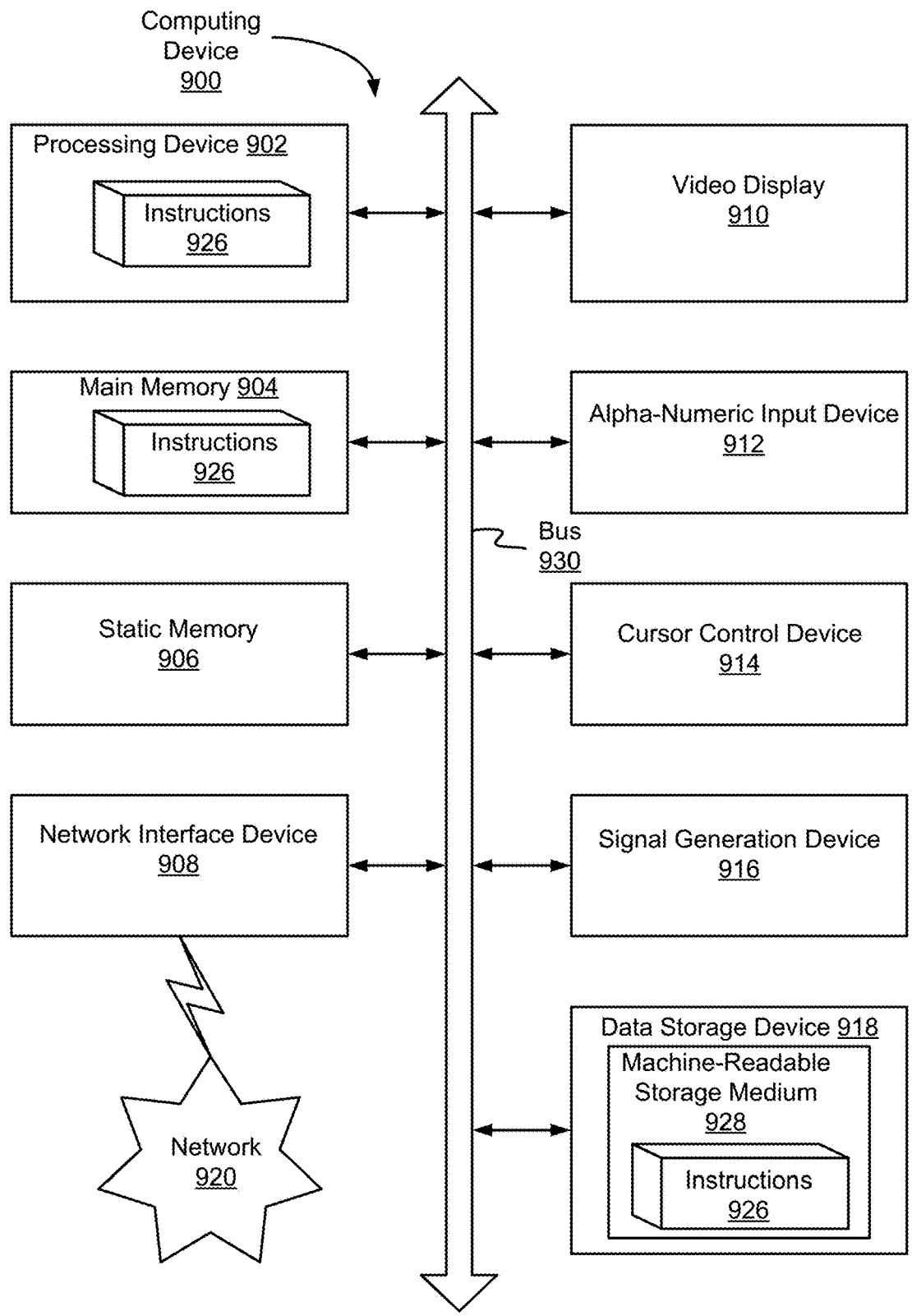
FIG. 9 is a schematic diagram of a computing device within which a set of instructions, for causing the computing device to perform any one or more of the functions described herein, may be executed, according to an implementation.

FIG. 9 illustrates a diagrammatic representation of a computing device 900 within which a set of instructions, for causing the device to perform any one or more of the methodologies discussed herein, may be executed. The computing device 900 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In some implementations, the device may be connected (e.g., networked) to other devices in a LAN, an intranet, an extranet, or the Internet. The device may operate in the capacity of a server machine in client-server network environment. The device may be a personal computer (PC), a set-top box (STB), a server, a network router, switch or bridge, or any device capable of executing a set of instructions (sequential or otherwise) that specify actions to be taken by that device. Further, while only a single device is illustrated, the term "device" shall also be taken to include any collection of devices that individually or jointly execute a set (or multiple sets) of instructions to perform any one or more of the methodologies discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 (e.g., instructions for an application ranking system) for performing the operations and steps discussed herein.

The computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one implementation, the video display unit 910, the alphanumeric input device 912, and the cursor control device 914 may be combined into a single component or device (e.g., an LCD touch screen).

The data storage device 918 may include a computer-readable storage medium 928 on which is stored one or more sets of instructions 926 (e.g., instructions for the application ranking system) embodying any one or more of the methodologies or functions described herein. The instructions 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 920 via the network interface device 908.

While the computer-readable storage medium 928 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

In one aspect, a system includes at least one processor and memory storing instructions that, when executed by the at least one processor, causes the computing system to perform any of the processes or methods disclosed herein.

What is claimed is:

1. A method, comprising:
   initializing a model including a plurality of channels, each channel including a two-dimensional (2D) convolution kernel, each 2D convolution kernel including two or more sub-kernels where the number of sub-kernels is based on an upscaling factor, and each of the two or more sub-kernels is used to generate one subset of pixels in a super-resolved image, where initializing a channel of the model includes:
   initializing parameters of a first sub-kernel the two or more sub-kernels associated with the channel, and
   copying the parameters of the first sub-kernel to other sub-kernels of the two or more sub-kernels, wherein as a result of the copying each of the two or more sub-kernels has the initialized parameters of the first sub-kernel;
   performing convolution of an input image with the two or more sub-kernels of the kernel and generating a plurality of first output images; and
   generating a second output image, as the super-resolved image, based on the plurality of first output images.

2. The method of claim 1, wherein
   the convolution is a sub-pixel convolution, and
   consecutive sub-kernels are associated with a sub-pixel space.

3. The method of claim 2, wherein the initializing of a parameter of the parameters includes assigning a weight to the parameter.

4. The method of claim 3, wherein the weight is assigned such that the sub-pixel convolution, after the initialization, is identical to a nearest neighbor (NN) resize convolution.

5. The method of claim 3, wherein the kernel is for a convolutional neural network (CNN) and the method further comprises:
   training the CNN and generating the super-resolved image based on the input image.

6. The method of claim 5, wherein the training further comprises:
   adjusting the parameters of a sub-kernel of the kernel; and
   repeating the copying, the performing, and the generating.

7. The method of claim 1, wherein generating the second output image based on the plurality of first output images includes re-arranging pixels of the plurality of first output images to generate the second output image.

8. A computing device, comprising:
   a processor; and
   a memory, the memory including instructions configured to cause the processor to:
   initialize a model including a plurality of channels, each channel including a two-dimensional (2D) convolution kernel each 2D convolution kernel including two or more sub-kernels where the number of sub-kernels is based on an upscaling factor, and each of the two or more sub-kernels is used to generate one subset of pixels in a super-resolved image, where initializing a channel of the model includes:
   initializing parameters of a first sub-kernel of the two or more sub-kernels associated with the channel, and;
   copying the parameters of the first sub-kernel to other sub-kernels of the two or more sub-kernels wherein as a result of the copying each of the two or more sub-kernels has the initialized parameters of the first sub-kernel;
   perform convolution of an input image with the sub-kernels of the kernel and generate a plurality of first output images; and
   generate a second output image, as the super-resolved image, based on the plurality of first output images.

9. The computing device of claim 8, wherein
   the convolution is a sub-pixel convolution, and
   consecutive sub-kernels are associated with a sub-pixel space.

10. The computing device of claim 9, wherein the initializing of a parameter of the parameters includes assigning a weight to the parameter.

11. The computing device of claim 10, wherein the weight is assigned such that the convolution, after the initialization, is identical to nearest neighbor (NN) resize convolution.

12. The computing device of claim 10, wherein the kernel is for a convolutional neural network (CNN) and wherein the processor is further configured to:
    train the CNN and generating the super-resolved image based on the input image.

13. The computing device of claim 12, wherein the processor is further configured to:
    adjust the parameters of the first sub-kernel; and
    repeat the copying, the performing, and the generating.

14. The computing device of claim 8, wherein generating the second output image based on the plurality of first output images includes re-arranging pixels of the plurality of first output images to generate the second output image.

15. A non-transitory computer-readable storage medium having stored thereon computer executable program code which, when executed on a computer system, causes the computer system to perform a method of progressive mesh compression, comprising:
    initializing a model including a plurality of channels, each channel including a two-dimensional (2D) convolution kernel, each 2D convolution kernel including two or more sub-kernels where the number of sub-kernels is based on an upscaling factor, and each of the two or more sub-kernels is used to generate one subset of pixels in a super-resolved image, where initializing a channel of the model includes:
    initializing parameters of a first sub-kernel the two or more sub-kernels associated with the channel, and;
    copying the parameters of the first sub-kernel to other sub-kernels of the two or more sub-kernels, wherein as a result of the copying each of the two-or more sub-kernels has the initialized parameters of the first sub-kernel;
    performing convolution of an input image with the sub-kernels of the kernel and generating a plurality of first output images; and
    generating a second output image, as the super-resolved image, based on the plurality of first output images.

16. The computer-readable storage medium of claim 15, wherein the initializing of a parameter of the parameters includes assigning a weight to the first sub-kernel for initializing the model as a convolutional neural network (CNN).

17. The computer-readable storage medium of claim 16, wherein the weight is assigned such that the convolution, after the initialization, is identical to nearest neighbor (NN) resize convolution.

18. The computer-readable storage medium of claim 16, wherein the computer-readable storage medium further comprises code for:
    training the CNN and generating the super-resolved image based on the input image.

19. The computer-readable storage medium of claim 18, wherein the training includes:
- adjusting the parameters of the first sub-kernel of the kernel; and
- repeating the copying, the performing, and the generating.

20. The computer-readable storage medium of claim 15, wherein generating the second output image based on the plurality of first output images includes re-arranging pixels of the plurality of first output images to generate the second output image.

* * * * *